United States Patent
Goo et al.

(10) Patent No.: US 9,535,526 B2
(45) Date of Patent: Jan. 3, 2017

(54) DISPLAY DEVICE INCLUDING TOUCH PANEL DEVICE, AND COUPLING-NOISE ELIMINATING METHOD

(71) Applicant: Samsung Display Co., Ltd., Yongin, Gyeonggi-Do (KR)

(72) Inventors: Nam-Hee Goo, Gunsan-si (KR); Bo-Ram Kim, Asan-si (KR); Myoung-Chul Kim, Dongducheon-si (KR); Byoung-Jun Lee, Cheonan-si (KR); Yun-Jae Kim, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/619,882

(22) Filed: Feb. 11, 2015

(65) Prior Publication Data

US 2015/0153883 A1   Jun. 4, 2015

Related U.S. Application Data

(62) Division of application No. 13/932,694, filed on Jul. 1, 2013, now abandoned, which is a division of application No. 12/755,660, filed on Apr. 7, 2010, now abandoned.

(30) Foreign Application Priority Data

Sep. 8, 2009   (KR) .......................... 10-2009-0084546

(51) Int. Cl.
*G06F 3/041*   (2006.01)

(52) U.S. Cl.
CPC ............. *G06F 3/0412* (2013.01); *G06F 3/041* (2013.01); *G06F 3/0418* (2013.01)

(58) Field of Classification Search
CPC ....... G06F 3/0412; G06F 3/041; G06F 3/0418
See application file for complete search history.

(56) References Cited

U.S. PATENT DOCUMENTS

| | | | |
|---|---|---|---|
| 5,327,163 A | 7/1994 | Hashimoto et al. | |
| 5,392,058 A | 2/1995 | Tagawa | |
| 5,574,262 A | 11/1996 | Petty | |
| 5,650,597 A | 7/1997 | Redmayne | |

(Continued)

FOREIGN PATENT DOCUMENTS

| | | |
|---|---|---|
| JP | 05006153 | 1/1993 |
| JP | 09128146 A | 5/1997 |

(Continued)

*Primary Examiner* — Claire X Pappas
*Assistant Examiner* — Robert Stone
(74) *Attorney, Agent, or Firm* — Cantor Colburn, LLP

(57) ABSTRACT

A display device includes; a touch panel device including; a touch panel and a touch controller connected to the touch panel, the touch controller including; a sampling unit which samples a sensing output signal input thereto from the touch panel to generate a sampled signal, and an analog/digital converter which converts the sampled signal to generate contact information, and a display panel device including; a display panel, a gate driver which applies a gate signal to the display panel, and a data driver which applies a data voltage to the display panel, wherein the sampling unit samples a portion of the sensing output signal which does not include a coupling noise.

6 Claims, 14 Drawing Sheets

(56) References Cited

U.S. PATENT DOCUMENTS

| | | | |
|---|---|---|---|
| 5,717,321 A * | 2/1998 | Kerth | G06F 3/045 323/283 |
| 5,736,980 A | 4/1998 | Iguchi et al. | |
| 5,945,973 A | 8/1999 | Sakai et al. | |
| 6,236,386 B1 | 5/2001 | Watanabe | |
| 6,239,788 B1 * | 5/2001 | Nohno | G06F 3/0412 178/18.03 |
| 6,459,739 B1 * | 10/2002 | Vitenberg | H04B 3/30 333/12 |
| 6,476,798 B1 * | 11/2002 | Bertram | G06F 3/044 178/18.05 |
| 6,624,835 B2 * | 9/2003 | Willig | G06F 3/0412 178/19.01 |
| 6,734,843 B2 | 5/2004 | Bertram et al. | |
| 6,968,171 B2 * | 11/2005 | Vanderhelm | H04B 1/126 455/278.1 |
| 7,170,501 B2 * | 1/2007 | Inamori | G06F 3/045 345/173 |
| 2002/0089491 A1 | 7/2002 | Willig | |
| 2003/0122798 A1 | 7/2003 | Shin | |
| 2006/0055680 A1 * | 3/2006 | Okazaki | G06F 3/045 345/173 |
| 2007/0120831 A1 | 5/2007 | Mahowald et al. | |
| 2007/0257890 A1 * | 11/2007 | Hotelling | G06F 3/0418 345/173 |
| 2007/0262966 A1 | 11/2007 | Nishimura et al. | |
| 2008/0129898 A1 | 6/2008 | Moon et al. | |
| 2008/0157893 A1 * | 7/2008 | Krah | G06F 3/0418 331/177 R |
| 2008/0278451 A1 | 11/2008 | Lee | |
| 2009/0015562 A1 * | 1/2009 | Yasukawa | G06F 3/0412 345/173 |
| 2009/0058818 A1 * | 3/2009 | Chang | G06F 3/044 345/173 |
| 2009/0315857 A1 * | 12/2009 | Nishitani | G06F 3/0416 345/174 |
| 2010/0060610 A1 | 3/2010 | Wu | |
| 2010/0079401 A1 | 4/2010 | Staton et al. | |
| 2010/0085322 A1 | 4/2010 | Mamba et al. | |
| 2010/0262425 A1 * | 10/2010 | Tanabe | G06T 5/002 704/233 |
| 2010/0295824 A1 * | 11/2010 | Noguchi | G02F 1/13338 345/175 |
| 2011/0115729 A1 | 5/2011 | Kremin et al. | |

FOREIGN PATENT DOCUMENTS

| | | |
|---|---|---|
| JP | 2975467 | 11/1999 |
| JP | 2000089912 A | 3/2000 |
| JP | 2001125744 A | 5/2001 |
| JP | 2002049467 A | 2/2002 |
| JP | 2006079405 A | 3/2006 |
| JP | 2006146895 A | 6/2006 |
| JP | 2007334606 A | 12/2007 |
| JP | 2009110418 A | 5/2009 |
| KR | 1019980065994 | 10/1998 |
| KR | 1020000052152 A | 8/2000 |
| KR | 1020040044619 A | 5/2004 |
| KR | 100460194 B1 | 11/2004 |
| KR | 1020050070212 A | 7/2005 |
| KR | 1020060054978 A | 5/2006 |
| KR | 1020060133330 A | 12/2006 |
| KR | 1020070106280 A | 11/2007 |
| KR | 1020080013638 A | 2/2008 |
| KR | 1020080042294 A | 5/2008 |
| KR | 1020080061324 A | 7/2008 |
| KR | 1020080075611 A | 8/2008 |

\* cited by examiner

DISPLAY DEVICE INCLUDING TOUCH PANEL DEVICE, AND COUPLING-NOISE ELIMINATING METHOD

This application is a divisional of U.S. patent application Ser. No. 13/932,694, filed on Jul. 1, 2013, which is a divisional of U.S. patent application Ser. No. 12/755,660, filed on Apr. 7, 2010, which claims priority to Korean Patent Application No. 10-2009-0084546, filed on Sep. 8, 2009, and all the benefits accruing therefrom under 35 U.S.C. §119, the content of which in its entirety is herein incorporated by reference.

BACKGROUND OF THE INVENTION (a) Field of the Invention

The present invention relates to a display device including a touch panel device, and a method for eliminating a coupling noise between the display device and the touch panel device.

(b) Description of the Related Art

A display device of a liquid crystal display ("LCD") and an organic light emitting device ("OLED"), a portable transmitting device, and other types of information processing devices execute a function thereof using various input devices, e.g., keyboards, mice, etc. Recently, the use of touch panels as an input device has increased.

The typical touch panel is a device for allowing a machine such as a computer to perform a desired command by writing a character, drawing a picture, or executing an icon through touching a finger or a touch pen (such as a stylus) on a screen. A display device to which the touch panel is attached can determine whether the finger of a user or a touch pen, etc., touches a screen, and touch position information thereof (the touch determination, i.e., the determination of whether a touch event occurred, and the positional information regarding the touch event may collectively be referred to as a "touch input"). The display device may then display images according to the position of the touch input.

These touch panels are typically classified as a resistive type, a capacitive type and an electro-magnetic ("EM") type according to the method by which the touch is sensed.

Among the various types of touch panels, the resistive type of touch panel typically includes upper and lower transparent electrodes separated from each other by a spacer. If an upper plate formed with the upper transparent electrode is depressed by external contact such that the upper transparent electrode and the lower transparent electrode physically contact each other, the contact and the position of the contact may be determined by measuring a voltage change according to the resistance of the depressed position. The resistive type of touch panel may be operated regardless of the conductivity of the contact matter, however when several positions are simultaneously touched, the values of the changed voltages are recognized jointly as one contact such that it is difficult to obtain simultaneous touch information from the several positions.

The capacitance type of touch panel typically includes a film formed with a transparent electrode, and touch determination and touch positions may be determined by measuring a voltage change of the conductive matter by the user contact after applying a voltage to the transparent electrode. The user contact in this type of touch panel is typically supplied by the finger of the user. This capacitance type touch panel may determine the contact existence and the contact position even if various positions are simultaneously contacted, however the voltage change is not generated when an insulator, such as gloves or other non-conductive surface, contact the touch panel such that the contact information may not be obtained.

The touch panel may be further classified into an external type in which the touch panel is attached to an outside of the display device and an embedded type in which the touch panel is located inside the display device itself.

A display panel of the display device may include a plurality of switching elements for switching a data voltage, and a plurality of signal lines, such as gate lines and data lines, for applying the data voltage to a plurality of pixels by controlling the switching elements. The gate lines transmit a gate signal including a gate-on voltage Von and a gate-off voltage Voff. Signals applied to the display panel, and especially signals having relatively large widths such as the gate signal, influence a sensing output signal of both the embedded and external touch panel, thereby generating unwanted coupling noise which deteriorates the quality of the associated display.

BRIEF SUMMARY OF THE INVENTION

The present invention eliminates coupling noise included in a sensing output signal of a touch panel device.

An exemplary embodiment of a display device according to a the present invention includes; a touch panel device including a touch panel and a touch controller; and a display panel device including a display panel, a gate driver which applies a gate signal to the display panel, and a data driver which applies a data voltage to the display panel, wherein the touch controller includes a sampling unit that samples a sensing output signal inputted from the touch panel to generate a sampled signal and an analog/digital ("A/D") converter which converts the sampled signal to generate contact information, and the sampling unit samples for a portion of the sensing output signal which does not include a coupling noise.

In one exemplary embodiment, the coupling noise may be in synchronization with at least one of a clock signal which generates the gate signal and the gate signal.

In one exemplary embodiment, the sampling unit may sample the sensing output signal by using a sampling enable signal, and the sampling enable signal may include a first voltage corresponding to a coupling noise of the sensing output signal, and a second voltage corresponding to a portion without the coupling noise.

In one exemplary embodiment, the display panel device may further include a signal controller for controlling the gate driver and the data driver, and the sampling enable signal may be generated in the signal controller by using at least one of a clock signal which generates the gate signal and the gate signal.

In one exemplary embodiment, the touch controller may further include a signal generator receiving at least one of a clock signal which generates the gate signal and the gate signal and generates the sampling enable signal.

In one exemplary embodiment, the touch controller may further include a register for storing sampling time information as information for a time that the sensing output signal is sampled, and the sampling unit may execute the sampling for the portion of the sensing output signal without the coupling noise by using the sampling time information.

In one exemplary embodiment, the sampling time information may be generated by synchronizing at least one of a clock signal which generates the gate signal and the gate signal with the sensing output signal, and a period of the sensing output signal may be an integer multiple of 1 horizontal period 1H.

Another exemplary embodiment of a display device according to the present invention includes: a touch panel device including a touch panel and a touch controller; and a display panel device including a display panel, a gate driver which applies a gate signal to the display panel, and a data driver which applies a data voltage to the display panel, wherein the touch controller includes a noise removing unit for removing a coupling noise from the sensing output signal inputted from the touch panel and for outputting a noise-free sensing output signal, a sampling unit for sampling the noise-free sensing output signal to generate a sampled signal, and an A/D converter which converts the sampled signal to generate contact information, and the noise removing unit further receives a reference noise signal from the touch panel and generates the noise-free sensing output signal by subtracting the reference noise signal from the sensing output signal.

In one exemplary embodiment, the coupling noise may be in synchronization with at least one of a clock signal which generates the gate signal and the gate signal, and the reference noise signal may include a reference voltage including 0V and the coupling noise.

In one exemplary embodiment, the touch panel may face the display panel, the touch panel may include a touch region for sensing a touch and a reference noise extracting region electrically separated from the touch region, the touch region may include a first electrode for outputting the sensing output signal, and the reference noise extracting region may include a second electrode for receiving a reference voltage including 0V and for outputting the reference noise signal to the touch controller.

In one exemplary embodiment, the touch region may include a plurality of x-axis electrodes and a plurality of y-axis electrodes insulated from and disposed substantially perpendicular to the x-axis electrodes, the sensing output signal may be output from a first x-axis electrode and a first y-axis electrode that correspond to a touch point of the touch panel among the plurality of x-axis electrodes and the plurality of y-axis electrodes, and the reference noise signal may be output from at least one of the plurality of x-axis electrodes except the first x-axis electrode and at least one of the plurality of y-axis electrodes except the first y-axis electrode.

Another exemplary embodiment of a display device according to the present invention includes a touch panel device including a touch panel and a touch controller, and a display panel device including a display panel, a gate driver applying a gate signal to the display panel, and a data driver applying a data voltage to the display panel. The touch controller inputs a sensing input signal and an inversion sensing input signal that is an inverted signal of the sensing input signal to the touch panel, and receives a sensing output signal corresponding to the sensing input signal and an inversion sensing output signal corresponding to the inversion sensing input signal from the touch panel. The touch controller includes a noise removing unit for removing a coupling noise from the sensing output signal to generate a noise-free sensing output signal, a sampling unit for sampling the noise-free sensing output signal to generate a sampled signal, and an A/D converter which converts the sampled signal to generate contact information. The noise removing unit generates the noise-free sensing output signal by subtracting the inversion sensing output signal from the sensing output signal and dividing the subtraction result in half.

Another exemplary embodiment of a display device according to the present invention includes a touch panel device including a touch panel and a touch controller, and a display panel device including a display panel, a gate driver which applies a gate signal to the display panel, and a data driver which applies a data voltage to the display panel. The touch controller includes a sampling unit for sampling a sensing output signal inputted from the touch panel to generate a sampled signal, a filter which generates a coupling noise removed signal by removing a coupling noise from the sampled signal, and an A/D converter which converts the coupling noise removed signal to generate contact information.

In one exemplary embodiment, the sampled signal may include a plurality of extracted data in series, the filter may compare the plurality of extracted data with each other, and the filter may compare a value of a first data of the plurality of extracted data with a value of previous data of the first data and a value of next data of the first data among the plurality of extracted data, and may remove the first data from the plurality of extracted data when a difference between the value of the first data and the value of the previous data or a difference between the value of the first data and the value of the next data is equal to or more than a predetermined value.

An exemplary embodiment of a method for eliminating a coupling noise of a display device according to the present invention, the display device including a touch panel device including a touch panel and a touch controller, and a display panel device including a display panel, a gate driver which applies a gate signal to the display panel, and a data driver applying a data voltage to the display panel, includes; receiving a sensing output signal including coupling noise from the touch panel; performing sampling for a portion of the sensing output signal without the coupling noise to generate a sampled signal; and converting the sampled signal to generate contact information.

In one exemplary embodiment, the coupling noise may be in synchronization with at least one of a clock signal which generates the gate signal and the gate signal.

In one exemplary embodiment, the executing of sampling for the portion of the sensing output signal without the coupling noise to generate the sampled signal may comprises using a sampling enable signal, and the sampling enable signal may include a first voltage corresponding to the coupling noise of the sensing output signal and a second voltage corresponding to a portion without the coupling noise.

In one exemplary embodiment, the display panel device may further include a signal controller for controlling the gate driver and the data driver, and the sampling enable signal may be generated in the signal controller by using at least one of a clock signal which generates the gate signal and the gate signal.

In one exemplary embodiment, the touch controller further may include a signal generator which generates the sampling enable signal by receiving at least one of a clock signal which generates the gate signal and the gate signal.

In one exemplary embodiment, the performing of sampling for the portion of the sensing output signal without the coupling noise to generate the sampled signal may comprise using sampling time information which is information for a time that the sensing output signal is sampled, and the touch controller may further include a register for storing the sampling time information.

In one exemplary embodiment, the sampling time information may be generated by synchronizing at least one of a clock signal which generates the gate signal and the gate signal with the sensing output signal, and a period of the sensing output signal may be an integer multiple of 1 horizontal period 1H.

Another exemplary embodiment of a method for eliminating a coupling noise of a display device according to the present invention, display device including a touch panel device including a touch panel and a touch controller, and a display panel device including a display panel, a gate driver applying a gate signal to the display panel, and a data driver applying a data voltage to the display panel includes; receiving a sensing output signal including a coupling noise, and a reference noise signal from the touch panel; generating a noise-free sensing output signal by subtracting the reference noise signal from the sensing output signal to remove the coupling noise from the sensing output signal; sampling the noise-free sensing output signal to generate a sampled signal; and converting the sampled signal to generate contact information.

In one exemplary embodiment, the coupling noise may be in synchronization with at least one of a clock signal which generates the gate signal and the gate signal, and the reference noise signal may include a reference voltage including 0V and the coupling noise.

In one exemplary embodiment, the touch panel may face the display panel, the touch panel may include a touch region for sensing a touch and a reference noise extracting region electrically separated from the touch region, the touch region may include a first electrode for outputting the sensing output signal, and the reference noise extracting region may be applied with a reference voltage including 0V and may include a second electrode for outputting the reference noise signal to the touch controller.

In one exemplary embodiment, the touch region may include a plurality of x-axis electrodes and a plurality of y-axis electrodes insulated from and disposed substantially perpendicular to the x-axis electrodes, the sensing output signal may be output from a first x-axis electrode and a first y-axis electrode corresponding to a touch point of the touch panel among the plurality of x-axis electrodes and the plurality of y-axis electrodes, and the reference noise signal may be output from at least one of the plurality of x-axis electrodes except the first x-axis electrode and from at least one of the plurality of y-axis electrodes except the first y-axis electrode.

Another exemplary embodiment of a method for eliminating a coupling noise of a display device according to the present invention, the display device including a touch panel device including a touch panel and a touch controller, and a display panel device including a display panel, a gate driver applying a gate signal to the display panel, and a data driver applying a data voltage to the display panel, includes; inputting to the touch panel a sensing input signal and an inversion sensing input signal that is an inverted signal of the sensing input signal; receiving a sensing output signal corresponding to the sensing input signal and an inversion sensing output signal corresponding to the inversion sensing input signal from the touch panel; generating a noise-free sensing output signal by subtracting the inversion sensing output signal from the sensing output signal and dividing the subtraction result in half; sampling the noise-free sensing output signal to generate a sampled signal; and converting the sampled signal to generate contact information.

Another exemplary embodiment of a method for eliminating a coupling noise of a display device according to the present invention, the display device including a touch panel device including a touch panel and a touch controller, and a display panel device including a display panel, a gate driver which applies a gate signal to the display panel, and a data driver which applies a data voltage to the display panel, includes; receiving a sensing output signal including a coupling noise from the touch panel, sampling the sensing output signal to generate a sampled signal, removing the coupling noise from the sampled signal to generate a coupling noise removed signal, and converting the coupling noise removed signal to generate contact information.

In one exemplary embodiment, the sampled signals may include a plurality of extracted data in series, the removing of the coupling noise from the sampled signal may include comparing a value of a first data of the plurality of extracted data with a value of previous data of the first data and a value of next data of the first data among the plurality of extracted data, and removing the first data from the plurality of extracted data when a different between the value of the first data and the value of the previous data or a difference between the value of the first data and the value of the next data is equal to or more than a predetermined value.

According to the present exemplary embodiments, when the touch panel is attached to the display panel or is embodied inside the display panel, the coupling noise of the gate signal may be removed such that an error generated by the coupling noise of the contact information may be prevented. Also, touch accuracy of the display device requiring minute touch resolution may be improved.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION OF THE INVENTION

Figure 1:
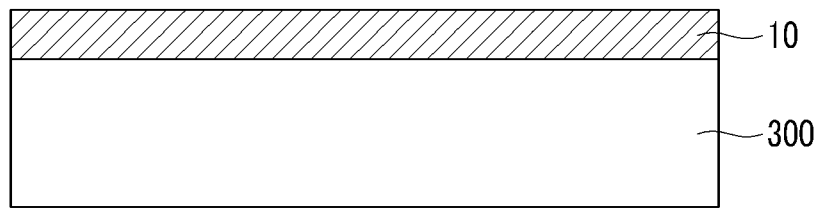
FIG. 1 is a cross-sectional view of an exemplary embodiment of a display device including a touch panel and a display panel according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Firstly, an exemplary embodiment of a display device according to the present invention will be described with reference to FIG. 1 to FIG. 5.

Figure 2:
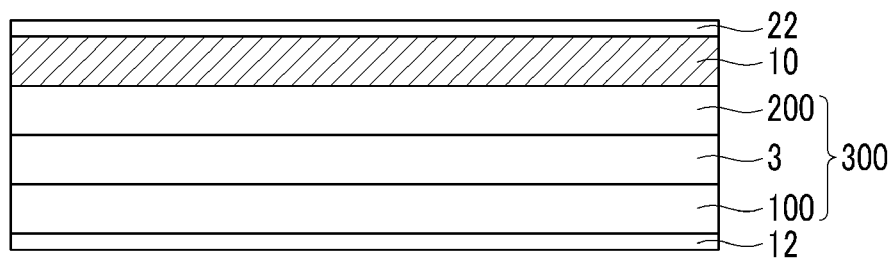
FIG. 2 is a cross-sectional view of an exemplary embodiment of a liquid crystal display ("LCD") including an exemplary embodiment of a touch panel and an exemplary embodiment of a liquid crystal panel according to the present invention.
Figure 3:
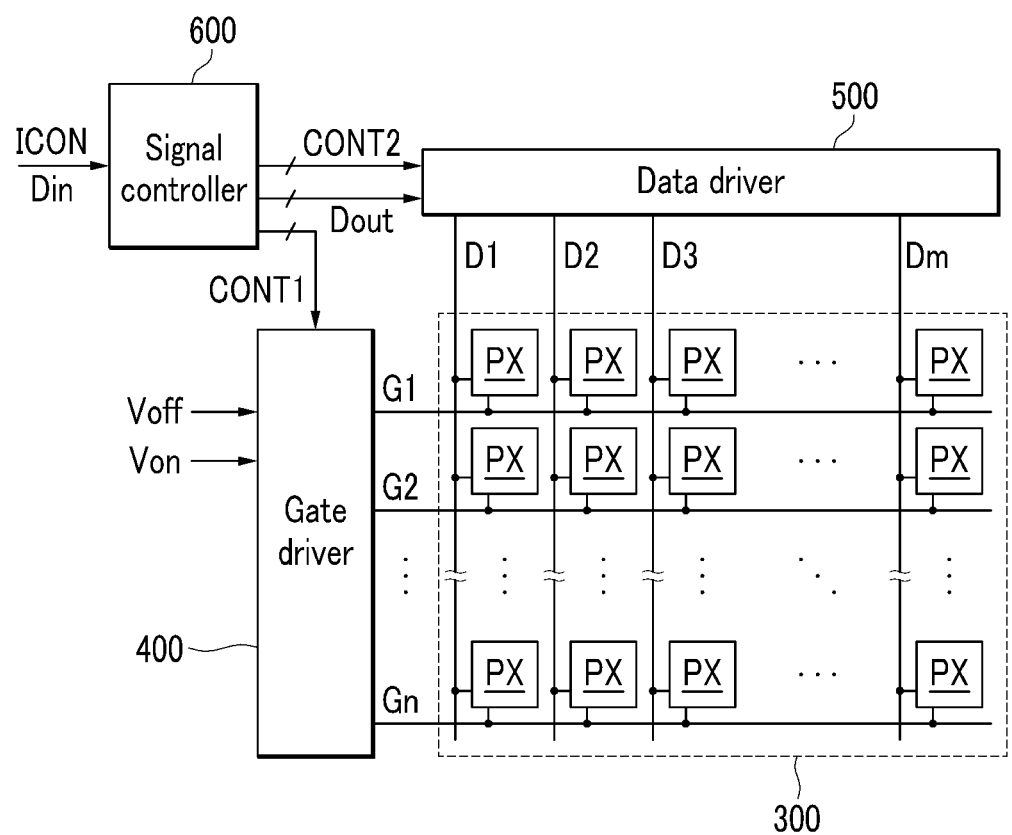
FIG. 3 is a block diagram of an exemplary embodiment of a display panel device of a display device according to the present invention.
Figure 4:
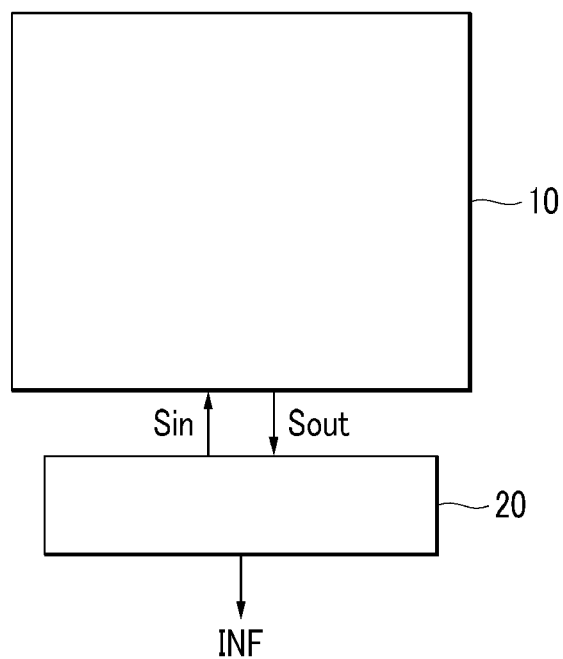
FIG. 4 is a block diagram of an exemplary embodiment of a touch panel device of a display device according to the present invention.
Figure 5:
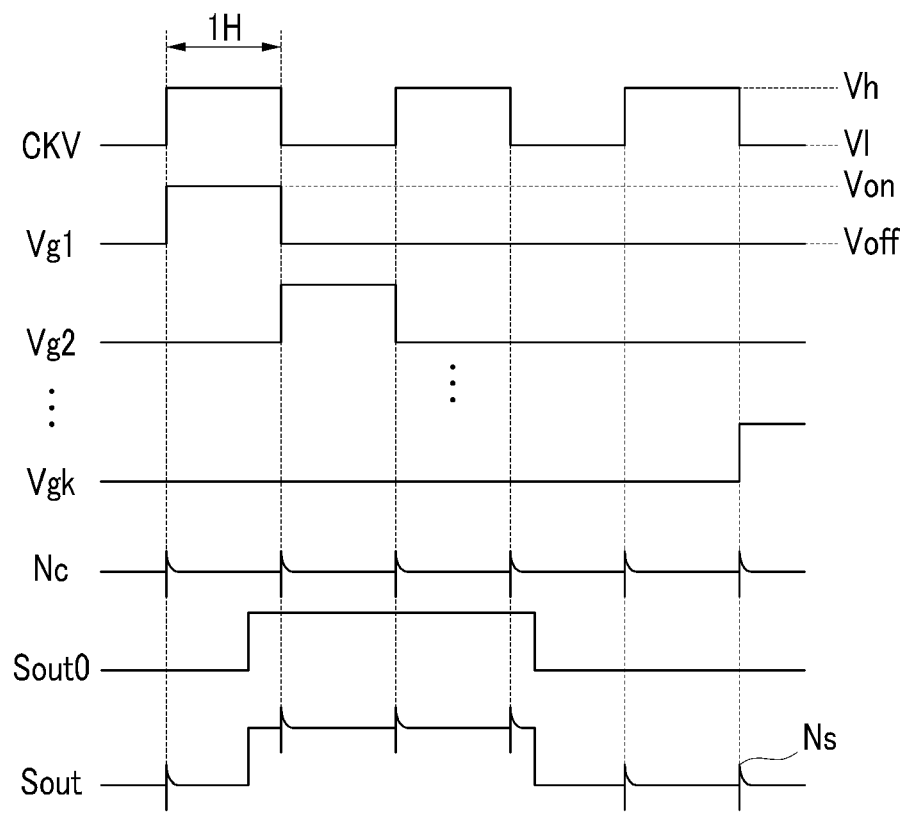
FIG. 5 is a waveform diagram of a clock signal, a gate signal, a coupling noise signal, a noise-free sensing output signal and a sensing output signal of an exemplary embodiment of a display device according to an exemplary embodiment of the present invention.
Figure 6:
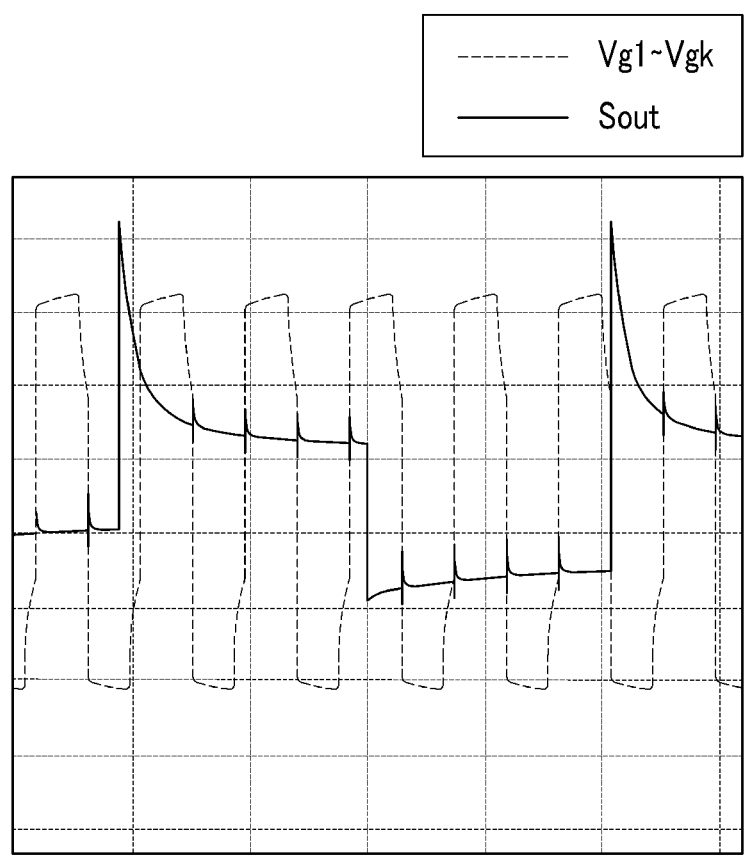
FIG. 6 is an actual waveform diagram of a gate signal and a sensing output signal of an exemplary embodiment of a display device according to the present invention.

FIG. 1 is a cross-sectional view of an exemplary embodiment of a display device including a touch panel and a display panel according to the present invention, FIG. 2 is a cross-sectional view of an exemplary embodiment of a liquid crystal display ("LCD") including a touch panel and a liquid crystal panel according to the present invention, FIG. 3 is a block diagram of an exemplary embodiment of a display panel device of a display device according to the present invention, FIG. 4 is a block diagram of an exemplary embodiment of a touch panel device of a display device according to the present invention, and FIG. 5 is a waveform diagram of a clock signal, a gate signal, a coupling noise signal, a noise-free sensing output signal, and a sensing output signal of an exemplary embodiment of a display device according to the present invention, and FIG. 6 is an actual waveform diagram of a gate signal and a sensing output signal of an exemplary embodiment of a display device according to the present invention.

Referring to FIG. 1, an exemplary embodiment of a display device according to the present invention includes a display panel device having a display panel 300, and a touch panel device having a touch panel 10. Embodiments include configurations wherein the touch panel 10 may be deposited on the display panel 300 or may be attached to, e.g., integrally formed as a single, unitary and indivisible unit with, the display panel 300.

The display panel device may be a flat panel display such as an LCD and an organic light emitting device ("OLED"), although the present invention is not limited thereto, and the display panel 300 may be a display panel for the flat panel display.

Referring to FIG. 3, the exemplary embodiment of a display panel device according to the present invention includes a display panel 300, a gate driver 400, a data driver 500 and a signal controller 600.

As shown in an equivalent circuit view, the display panel 300 includes a plurality of signal lines G1-Gn and D1-Dm, and a plurality of pixels PX connected thereto and arranged substantially in a matrix shape. The signal lines G1-Gn and D1-Dm include a plurality of gate lines G1 to Gn for transmitting gate signals (also referred as "scanning signals") and a plurality of data lines D1 to Dm for transmitting a plurality of data voltages. Each pixel PX, for example the pixel PX connected to the i-th (i=1, 2, . . . , n) gate line Gi and the j-th (j=1, 2, . . . , m) data line Dj, includes a switching element (not shown) connected to the gate line Gi and the data line Dj.

The gate driver 400 is connected to the scanning lines G1-Gn of the display panel 300 to apply a scanning signal consisting of a combination of a gate-on voltage Von for turning on the switching element and a gate-off voltage Voff for turning off the switching element to the scanning lines G1-Gn.

The data driver 500 is connected to the data lines D1-D2m of the display panel 300 to apply the data voltage to the data lines D1-D2m.

The signal controller 600 controls the gate driver 400 and the data driver 500. The signal controller 600 receives an input image signal Din and an input control signal ICON for controlling the display of the input image signal Din from an external supply (not shown). The input image signals Din includes information about luminance of each pixel PX, and examples of the input control signal include a vertical synchronization signal, a horizontal synchronizing signal, a main clock signal, a data enable signal and various other similar signals.

Referring to FIG. 4, the exemplary embodiment of a touch panel device according to the present invention includes a touch panel 10 and a touch controller 20 connected thereto.

The touch panel 10 receives a sensing input signal "Sin" from the touch controller 20, and if a contact, such as the application of a force to the touch controller 20 via a finger of a user, is applied to the surface of the touch panel 10, the touch panel 10 senses the contact and the sensing output signal "Sout" is output to the touch controller 20. The touch controller 20 processes the sensing output signal to generate the contact information "INF" such as the coordinate of the contact position, and the contact information INF is output to the external device (not shown). The external device transmits the input image signal to the display panel device based on the contact information INF.

Referring to FIG. 2, another embodiment of a display device according to the present invention includes the display panel device having the display panel 300, and the touch panel device having the touch panel 10.

The present exemplary embodiment of a display panel 300 includes a lower panel 100 and an upper panel 200 disposed substantially opposite to each other, and a liquid crystal layer 3 interposed therebetween. Polarizers 12 and 22 are provided on the outer surfaces of the display panel 300; embodiments include configurations wherein the polarizers 12 and 22 are disposed directly on the display panel 300 and configurations wherein the polarizers 12 and 22 may be disposed such that intervening layers are present between the polarizers 12 and 22 and the display panel 300. The transmissive axis of the two polarizers 12 and 22 may be crossed with, e.g., substantially perpendicular to, each other, and exemplary embodiments also include configurations wherein one of the two polarizers 12 and 22 may be omitted.

In the exemplary embodiment shown in FIG. 2, the touch panel 10 is disposed between the display panel 300 and the polarizer 22. Alternative exemplary embodiments include configurations wherein the touch panel 10 may be disposed under the upper panel 200 of the display panel 300 or may be attached outside the polarizer 22. The exemplary embodiment in which the touch panel 10 is attached outside the polarizer 22 may also be referred to as an external type display device, and the exemplary embodiment in which the touch panel 10 is attached inside the polarizer 22 may also be referred to as the embedded type display device.

The various characteristics related to FIG. 1, FIG. 3, and FIG. 4 may be applied to the exemplary embodiment of FIG. 2.

Now, an exemplary embodiment of the operation of the display device will be described.

The signal controller 600 processes the input image signals Din to convert the output image signal Dout and to generate the gate control signal CONT1 and the data control signal CONT2, and outputs the gate control signal CONT1 to the gate driver 400, and outputs the data control signal CONT2 and the output image signal Dout to the data driver 500.

Embodiments of the scan control signals CONT1 include a scanning start signal for instructing to start scanning, and at least one clock signal for controlling the output period of the gate-on voltage Von.

Referring to FIG. 5, the pulse width of the clock signal CKV is about 1 horizontal period (or "1H", which is one period of the horizontal synchronizing signal and the data enable signal), and in one exemplary embodiment the duty ratio may be about 50%. The clock signal CKV swings between the high level voltage Vh and the low level voltage Vl, and when the clock signal CKV is increased to the high level voltage Vh or is decreased to the low level voltage Vl, the gate signal is generated in synchronization therewith as illustrated by gate signals Vg1 through Vgk. The pulse width of the gate signal, that is the time period of the gate-on voltage Von, is 1H.

The data driver 500 receives output image signal Dout for one row of pixels PXs according to the data control signal CONT2 from the signal controller 600 and converts the output image signal Dout into a corresponding data voltage and then applies the corresponding data voltage to the corresponding data lines D1-Dm.

The gate driver 400 applies the gate-on voltage Von to a gate line of the plurality of gate lines G1-Gn in response to the scanning control signals CONT1 from the signal controller 600, thereby turning on the switching element connected to the applied gate line such that the data voltage applied to the data lines D1-Dm is applied to the corresponding pixel through the turned-on switching element.

After a time period of 1H, the data driver 500 and the gate driver 400 repeat the same operation for a pixel of the next row. In such a manner, the gate-on voltage Von is applied to all of the gate lines G1a to Gmh during one frame, and the data voltage is applied to all of the pixels in a row by row manner.

Referring to FIG. 5 and FIG. 6, the sensing output signal Sout output from the touch panel 10 is influenced by the gate signals Vg1, . . . , Vgk applied to the plurality of gate lines (e.g., from the first gate line G1 to the k-th gate line Gk (k=1, . . . , n)). That is, the sensing output signal Sout is coupled to the gate signals (Vg, . . . , Vgk) such that the noise-free sensing output signal Sout0 is added with the coupling noise signal Nc such that the sensing output signal Sout is output when the voltage of the gate signals Vg, . . . , Vgk is increased or decreased. The sensing output signal Sout includes a plurality of coupling noises Ns. While not limiting of the present invention, the coupling of the gate signals and the sensing output signal Sout may be capacitive coupling.

For illustrative purposes, the gate signals Vg1, . . . , Vgk of the gate lines G1 through the k-th gate line Gk (k=1, . . . , n) is represented by one signal in FIG. 6.

The coupling noise Ns added to the sensing output signal Sout may be undesirably substantial when the touch panel 10 is positioned inside the display panel 300 or attached closely to the display panel 300 as shown in FIG. 1 and FIG. 2. If the sensing output signal Sout with the added coupling noise Ns is sampled in an unmodified state to obtain the contact information INF, the value of the coupling noise may be processed such that erroneous contact information INF corresponding to the coupling noise Ns may be obtained.

Next, a method for eliminating a coupling noise of the touch panel device by obtaining correct contact information INF omitting a coupling noise of a sensing output signal Sout will be described with reference to FIG. 7 to FIG. 9 as well as FIG. 1 to FIG. 6.

Figure 7:
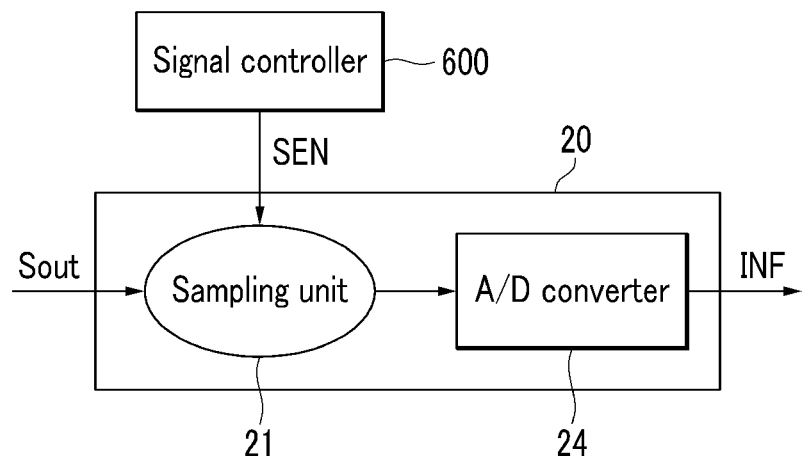
FIG. 7 and FIG. 8 are block diagrams of an exemplary embodiment of a touch controller according to the present invention.
Figure 8:
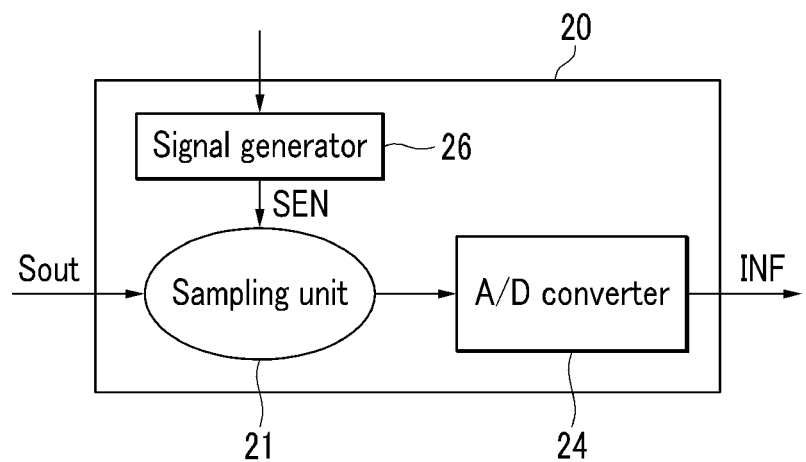
Figure 9:
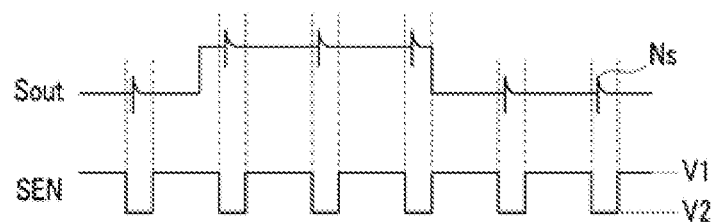
FIG. 9 is a waveform diagram of a sensing output signal and a sampling enable signal according to the exemplary embodiment of a touch controller shown in FIG. 7 and FIG. 8.

FIG. 7 and FIG. 8 are block diagrams of an exemplary embodiment of a touch controller according to the present invention, and FIG. 9 is a waveform diagram of a sensing output signal and a sampling enable signal according to the exemplary embodiment of a touch controller shown in FIG. 7 and FIG. 8.

Referring to FIG. 7, the exemplary embodiment of a touch controller 20 of the touch panel device according to the present invention includes a sampling unit 21 and an analog/digital ("A/D") converter 24.

The sampling unit 21 receives a sampling enable signal SEN from the signal controller 600 of the display panel device and samples the sensing output signal Sout from the touch panel 10 based on the sampling enable signal SEN, and outputs the sampled data to the A/D converter 24.

The sampling enable signal SEN, which is a signal for the position information of the coupling noise Ns of the sensing output signal Sout, instructs the sampling unit 21 sample the sensing output signal Sout during a portion of the sensing output signal Sout where the coupling noise Ns is not present. The sampling enable signal SEN includes a low level voltage V2 and a high level voltage V1, and may be generated by using the clock signal CKV or the gate signals Vg1, . . . , Vgk in the signal controller 600.

As shown in FIG. 9, the sampling enable signal SEN includes a pulse rising at a predetermined time after a rising time of the gate signals Vg1, . . . , Vgk and falling at a predetermined time before the next rising time of the gate signals Vg1, . . . , Vgk. The time length between the rising time of the gate signals Vg1, . . . , Vgk and the rising time of the pulse of the sampling enable signal SEN or the time length between the falling time of the pulse of the sampling enable signal SEN and the next rising time of the gate signals Vg1, . . . , Vgk may be, for example, equal to or less than $\frac{1}{4}$H. That is, the time while the high level voltage V1 is maintained may be equal to or over $\frac{1}{2}$H and less than 1H. Also, the period of the sampling enable signal may be 1H. The sampling unit 21 does not execute the sampling function during the time when the sampling enable signal SEN is at the low voltage V2, and the values of the sensing output signal Sout are sampled only during the time when the sampling enable signal SEN is the high voltage V1. Alternative embodiments include configurations wherein the positions of the high voltage V1 and the low voltage V2 of the sampling enable signal SEN may be exchanged with each other. In one such alternative embodiment, the sampling unit 21 would execute the sampling function only during the time when the sampling enable signal SEN was at the low voltage.

The A/D converter 24 converts the sampled signal into a digital data to generate contact information INF such as coordinates of the contact position, and outputs the contact information INF to an external device.

As described above, sampling is performed avoiding the coupling noise Ns of the sensing output signal Sout, such that an influence of the coupling noise may be removed from the contact information.

Referring to FIG. 8, differently from the exemplary embodiment of FIG. 7, the sampling enable signal SEN may be generated in a signal generator 26 within the touch controller 20. The signal generator 26 may receive the clock signal CKV or the gate signal from the display panel device to generate the sampling enable signal SEN as shown in FIG. 9, and may supply the sampling enable signal SEN to the sampling unit 21.

Next, a coupling noise eliminating method of another exemplary embodiment of a touch panel device according to the present invention will be described with reference to FIG. 10 and FIG. 11 as well as FIG. 1 to FIG. 6.

Figure 10:
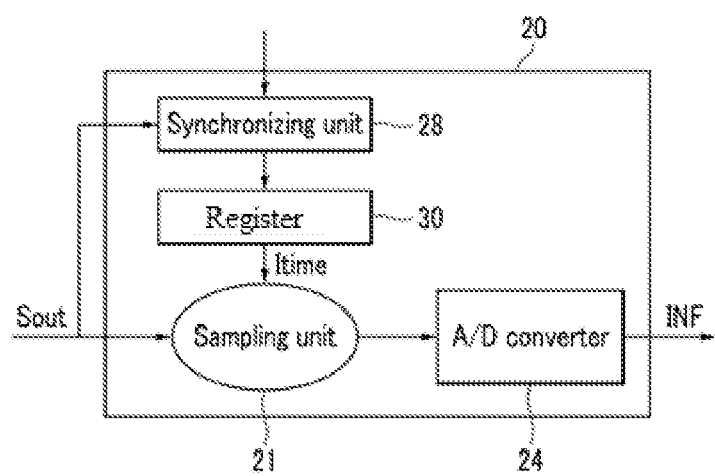
FIG. 10 is a block diagram of another exemplary embodiment of a touch controller according to the present invention.
Figure 11:
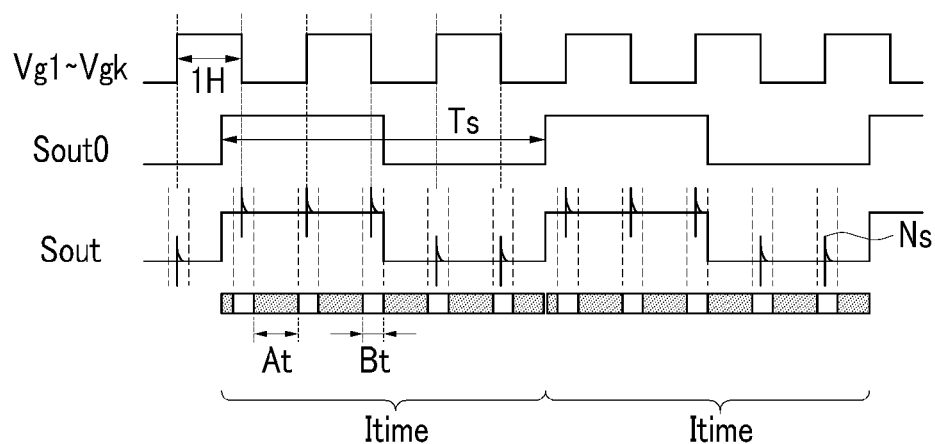
FIG. 11 is a waveform diagram of a gate signal, a noise-free sensing output signal, and a sensing output signal according to the exemplary embodiment of a touch controller shown in FIG. 10.

FIG. 10 is a block diagram of another exemplary embodiment of a touch controller according to the present invention, and FIG. 11 is a waveform diagram of a gate signal, a noise-free sensing output signal, and a sensing output signal according to the exemplary embodiment of a touch controller shown in FIG. 10.

Referring to FIG. 10, a touch controller 20 of a touch panel device according to an exemplary embodiment of the present invention includes a synchronizing unit 28, a register 30, a sampling unit 21 and an A/D converter 24.

The synchronizing unit 28 receives the clock signal CKV or the gate signals Vg1, . . . , Vgk from the display panel device, synchronizes them with the sensing output signal Sout, such that a time period wherein the coupling noise is not present in the sensing output signal Sout, that is, the sampling time, is determined. To make the sampling time uniform for every period of the sensing output signal Sout, the period Ts of the sensing output signal Sout may be N times (N=1, 2, . . . , wherein N is a positive integer) 1H. Accordingly, as shown in FIG. 11, the position of the coupling noise Ns is uniform every period of the sensing output signal Sout.

This determined sampling time as a sampling time information Itime that is the information during the period Ts of the sensing output signal Sout is stored in the register 30, and then is provided to the sampling unit 21. The sampling time information Itime includes a blocking period Bt corresponding to the coupling noise Ns and a sampling period At corresponding to the portion of the sensing output signal Sout where the coupling noise Ns is not present. For example, the blocking period Bt may start ¼H or less before the coupling noise time and end ¼H or less after the coupling noise time. That is, the blocking period Bt may last ½H or less around the point of the coupling noise, and the sampling period At may last ½H or more avoiding the point of the coupling noise.

The sampling unit 21 receives the sampling time information Itime from the register 30 to execute the sampling using the sampling time information Itime excluding the coupling noise Ns of the sensing output signal Sout, and outputs the sampled result to the A/D converter 24. As shown in FIG. 11, the sampling time information Itime may correspond to the period Ts of the sensing output signal Sout.

The A/D converter 24 converts the sampled signal into a digital data to generate contact information INF such as coordinates of the contact position and output the contact information INF to an external device.

As described above, the sampling position of the sensing output signal Sout is previously determined and is stored to the register 30 of the touch controller 20 such that the influence by the coupling noise may be easily removed from the contact information INF.

Next, a coupling noise eliminating method of another exemplary embodiment of a touch panel device according to the present invention will be described with reference to FIG. 12 to FIG. 16 as well as FIG. 1 to FIG. 6.

Figure 12:
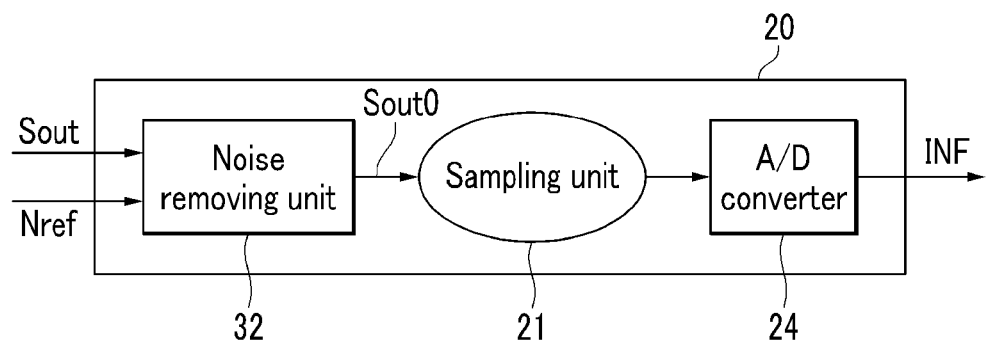
FIG. 12 is a block diagram of another exemplary embodiment of a touch controller according to the present invention.
Figure 13:
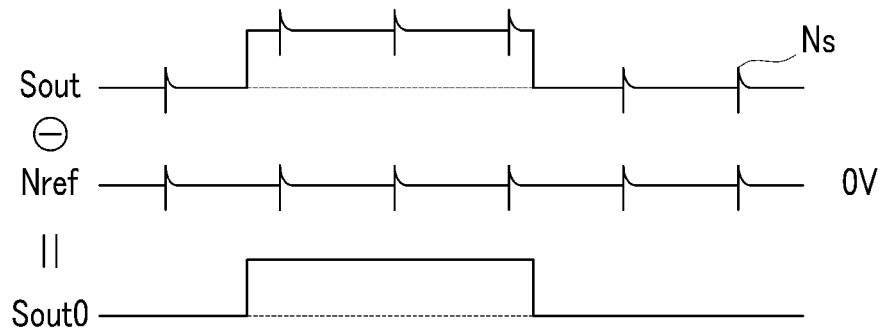
FIG. 13 is a waveform diagram of a sensing output signal, a reference noise signal, and a coupling noise removed sensing output signal according to the exemplary embodiment of a touch controller shown in FIG. 12.

FIG. 12 is a block diagram of another exemplary embodiment of a touch controller according to the present invention, and FIG. 13 is a waveform diagram of a sensing output signal, a reference noise signal, and a coupling noise removed sensing output signal according to the exemplary embodiment of a touch controller shown in FIG. 12.

Referring to FIG. 12, an exemplary embodiment of a touch controller 20 of a touch panel device according to the present invention includes a noise removing unit 32, a sampling unit 21, and an A/D converter 24.

The noise removing unit 32 receives the sensing output signal Sout and a reference noise signal Nref from the touch panel 10 to remove the coupling noise Ns from the sensing output signal Sout and to generate the noise-free sensing output signal Sout0. The reference noise signal Nref is a signal including only the coupling noise Ns of the sensing output signal Sout with reference to the reference voltage such as 0V, as shown in FIG. 13. The noise removing unit 32 subtracts the reference noise signal Nref from the input sensing output signal Sout to remove the coupling noise from the sensing output signal Sout, thereby generate the noise-free sensing output signal Sout0.

The sampling unit 21 samples the noise-free sensing output signal Sout0 and outputs it to the A/D converter 24.

The A/D converter 24 converts the sampled signal into digital data to generate the contact information INF such as coordinates of the contact position, and outputs the contact information INF to an external device.

As described above, the influence of the coupling noise may be easily removed from the contact information INF by subtracting the reference noise signal Nref from the sensing output signal Sout.

Next, an exemplary embodiment of a method for generating a reference noise signal Nref according to the present invention will be described with reference to FIG. 14.

Figure 14:
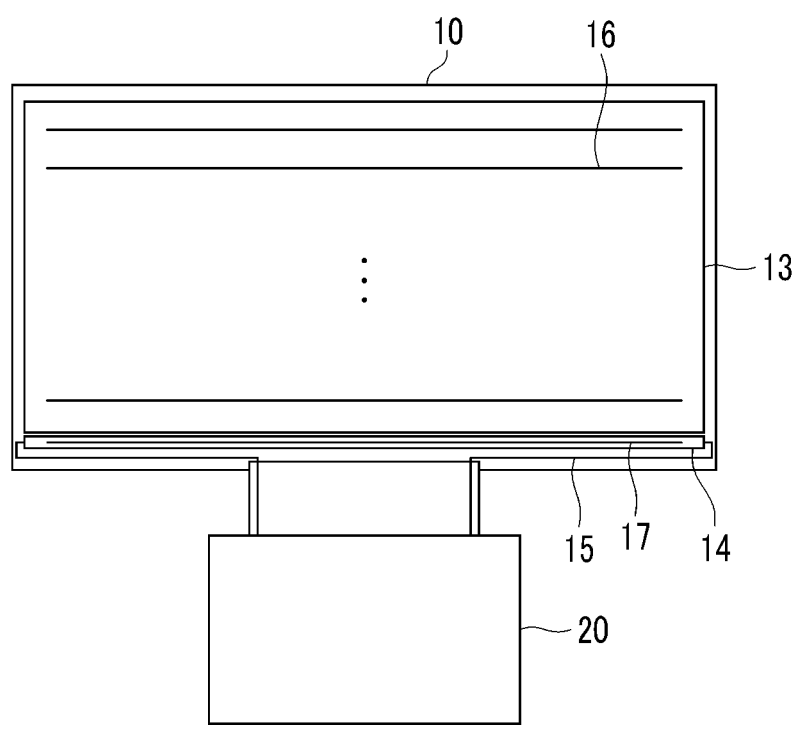
FIG. 14 is a block diagram of an exemplary embodiment of a touch panel device including the exemplary embodiment of a touch controller shown in FIG. 12.

FIG. 14 is a block diagram of an exemplary embodiment of the touch panel device shown in FIG. 12.

Referring to FIG. 14, the exemplary embodiment of a touch panel device according to the present invention includes a touch panel 10 and a touch controller 20, and the touch panel 10 includes a touch region 13 and a reference noise extracting region 14. As illustrated in FIG. 14, the reference noise extracting region 14 is disposed in a thin strip along a bottom portion of the touch panel 10, however the shape and location of the reference noise extracting region 14 is not limited thereto.

Electrodes 16 for transmitting the sensing input signal Sin or the sensing output signal Sout are formed in the touch region 13, and an additional electrode 17 that is separated from the electrodes 16 of the touch region 13 is formed in the reference noise extracting region 14. Both ends of the additional electrode 17 of the reference noise extracting region 14 are applied with the reference voltage such as 0 V from the touch controller 20 through a reference noise signal line 15. The output signal from the additional electrode 17 of the reference noise extracting region 14, that is, the reference noise signal Nref, is influenced by the coupling noise generated by the gate signal of the display panel directly under the additional electrode 17, and such reference noise signal is essentially equivalent to, e.g., it is the same as, the coupling noise Ns included in the sensing output signal Sout from the touch region 13.

Next, an exemplary embodiment of a method for generating a reference noise signal Nref according to the present invention will be described with reference to FIG. 15 and FIG. 16.

Figure 15:
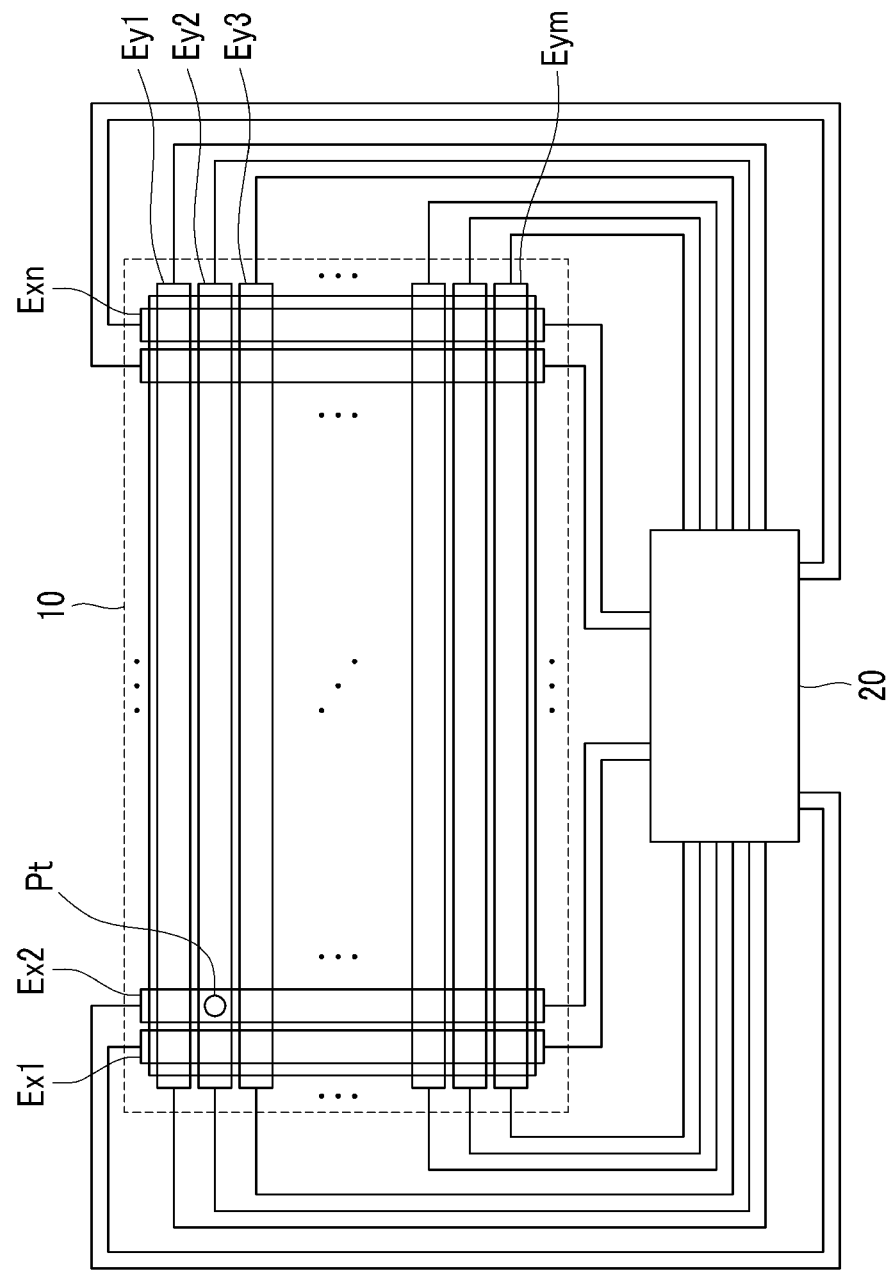
FIG. 15 is a block diagram of another exemplary embodiment of a touch panel device including the exemplary embodiment of a touch controller shown in FIG. 12.
Figure 16:
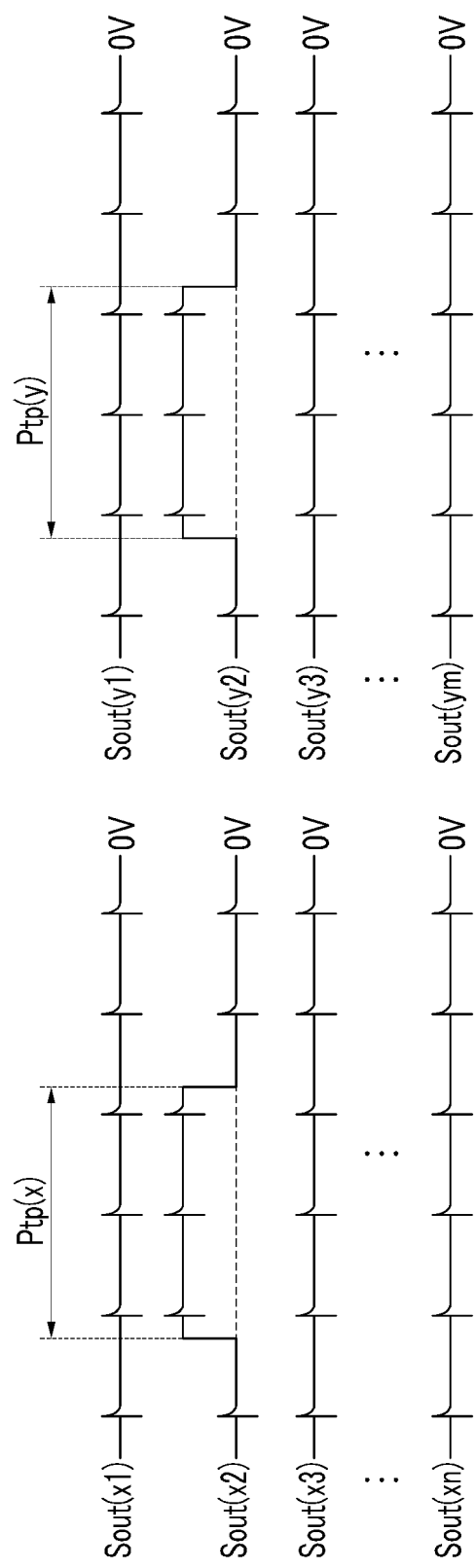
FIG. 16 is a waveform diagram of a sensing output signal according to the exemplary embodiment of a touch panel device shown in FIG. 15.

FIG. 15 is a block diagram of another exemplary embodiment of the touch panel device, and FIG. 16 is a waveform diagram of a sensing output signal according to the exemplary embodiment of a touch panel device shown in FIG. 15.

Referring to FIG. 15, an exemplary embodiment of a touch panel 10 according to the present invention includes a plurality of y-axis electrodes Ey1, Ey2, Ey3, . . . , Eym that are substantially parallel to each other and extended in the row direction, and a plurality of x-axis electrodes Ex1, Ex2, Ex3, . . . , Exn that are substantially parallel to each other and extended in the column direction and insulated from and intersecting the y-axis electrodes Ey1, Ey2, Ey3, . . . , Eym. In one exemplary embodiment, the y-axis electrodes and the x-axis electrodes are disposed substantially perpendicular to one another Exemplary embodiments include configurations wherein the x-axis electrodes Ex1, Ex2, Ex3, . . . , Exn and the y-axis electrodes Ey1, Ey2, Ey3, . . . , Eym may be made of a transparent conductive material such as indium tin oxide ("ITO"), indium zinc oxide ("IZO") and other materials with similar characteristics. The x-axis electrodes Ex1, Ex2, Ex3, . . . , Exn and the y-axis electrodes Ey1, Ey2, Ey3, . . . , Eym are respectively connected to the touch controller 20 through the signal lines thereby receiving the sensing input signal Sin and outputting the sensing output signal Sout to the touch controller 20. This exemplary embodiment of a touch panel device may obtain contact information of a multi-touch event even when several positions are simultaneously touched.

As shown in FIG. 15, if an external object is contacted at a touch point Pt (e.g., the intersection of the x-axis electrode Ex2 and the y-axis electrode Ey2) of the touch panel 10, as shown in FIG. 16 sensing output signals Sout(x2) and Sout(y2) including a touch period Ptp(x) and Ptp(y) including the information of the touch position, and the coupling noise caused by the gate signal are output from the x-axis electrode Ex2 and the y-axis electrode Ey2 at the touch point Pt. However, output signals Sout(x1), Sout(x3), . . . , Sout(xn), and Sout(y1), Sout(y3), . . . , Sout(ym) only include the coupling noise caused by the gate signal with reference to the reference voltage such as 0V and are output from the x-axis electrodes Ex1, Ex3, . . . , Exn and the y-axis electrodes Ey1, Ey3, . . . , Eym except for the touch point Pt. The output signals Sout(x1), Sout(x3), . . . , Sout(xn), and Sout(y1), Sout(y3), . . . , Sout(ym), which include only the coupling noise caused by the gate signal with reference to the reference voltage such as 0V, may be used as the reference noise signal Nref as shown in FIG. 13.

Next, an exemplary embodiment of a method for eliminating the coupling noise of a touch panel device according to the present invention will be described with reference to FIG. 17 to FIG. 19 as well as FIG. 1 to FIG. 6.

Figure 17:
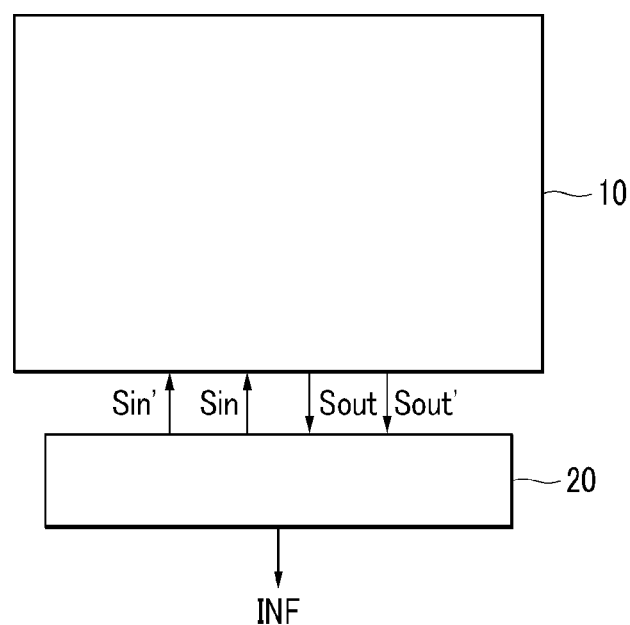
FIG. 17 is a block diagram of an exemplary embodiment of a touch panel device according to the present invention.
Figure 18:
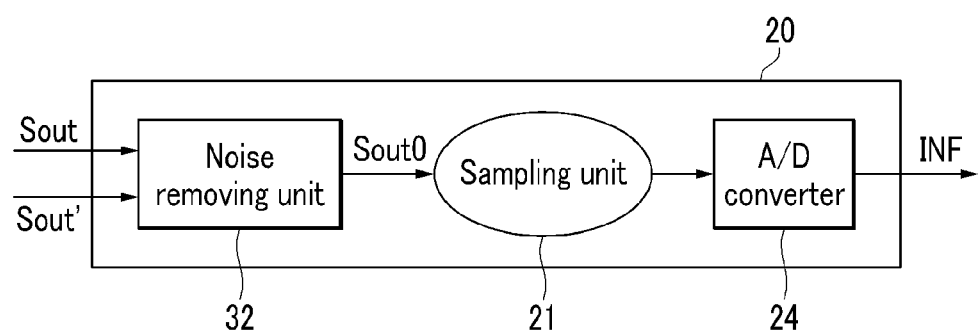
FIG. 18 is a block diagram of an exemplary embodiment of a touch controller according to the exemplary embodiment of a touch panel device shown in FIG. 17.
Figure 19:
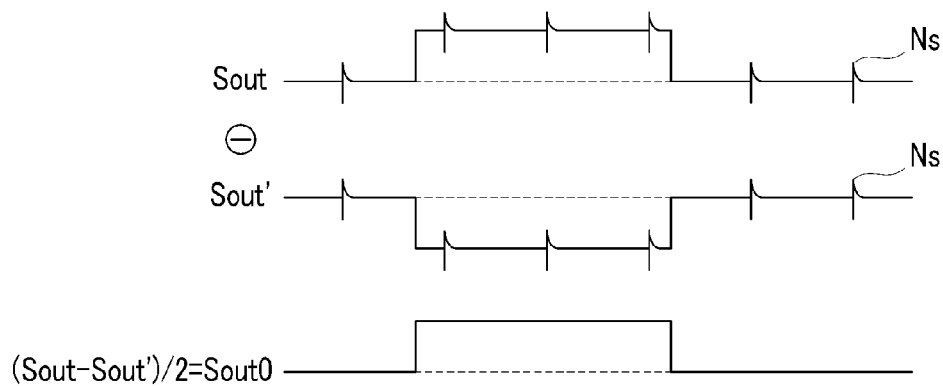
FIG. 19 is a waveform diagram of a sensing output signal, a reversion sensing output signal, and a coupling noise removed sensing output signal including the exemplary embodiment of a touch panel device and touch controller shown in FIG. 17 and FIG. 18.

FIG. 17 is a block diagram of another exemplary embodiment of a touch panel device according to the present invention, FIG. 18 is a block diagram of a touch controller according to the exemplary embodiment of a touch panel device shown in FIG. 17, and FIG. 19 is a waveform diagram of a sensing output signal, a reversion sensing output signal and a coupling noise removed sensing output signal according to the exemplary embodiment of a touch panel device and touch controller shown in FIG. 17 and FIG. 18.

Referring to FIG. 17, an exemplary embodiment of a touch panel device according to the present invention includes a touch panel 10 and a touch controller 20 connected thereto.

The touch controller 20 sequentially inputs an inversion sensing input signal Sin' and the sensing input signal Sin to the touch panel 10 and receives the sensing output signal Sout and an inversion sensing output signal Sout' from the touch panel 10. The inversion sensing input signal Sin' is a polarity-inverted signal of the sensing input signal Sin, the inversion sensing output signal Sout' is an output signal corresponding to the inversion sensing input signal Sin', and, as has been previously described, the sensing output signal Sout is the output signal corresponding to the sensing input signal Sin.

The touch controller 20 processes the sensing output signal Sout to generate contact information INF such as coordinates of the contact position, and sends it to an external device (not shown). The external device transmits the input image signal to the display panel device based on the contact information INF.

Referring to FIG. 18, the touch controller 20 includes a noise removing unit 32, a sampling unit 21 and an A/D converter 24.

The noise removing unit 32 receives the sensing output signal Sout and the inversion sensing output signal Sout' from the touch panel 10, removes the coupling noise Ns from the sensing output signal Sout, and thereby generates a noise-free sensing output signal Sout. Next, an exemplary embodiment of a method for removing the coupling noise will be described with reference to FIG. 19.

Referring to FIG. 19, the coupling noise Ns loaded in the sensing output signal Sout and the inversion sensing output signal Sout' have substantially the same phase and the same potential values, and the remaining portions are substantially similar except that they have the opposite polarity. Accordingly, as shown in FIG. 19, if the inversion sensing output signal Sout' is subtracted from the sensing output signal Sout, and then the subtraction result is divided by 2, i.e., the subtraction result is divided in half, the coupling noises Ns are offset with each other such that the noise-free sensing output signal Sout0 may be simply obtained.

The sampling unit 21 samples the noise-free sensing output signal Sout0 and sends it to the A/D converter 24 and the A/D converter 24 converts the sampled signal into the digital data to generate the contact information INF such as the coordinates of the contact position and sends it to an external device.

Next, an exemplary embodiment of a method for eliminating the coupling noise of another exemplary embodiment of a touch panel device according to the present invention will be described with reference to FIG. 20 to FIG. 22 as well as FIG. 1 to FIG. 6.

Figure 20:
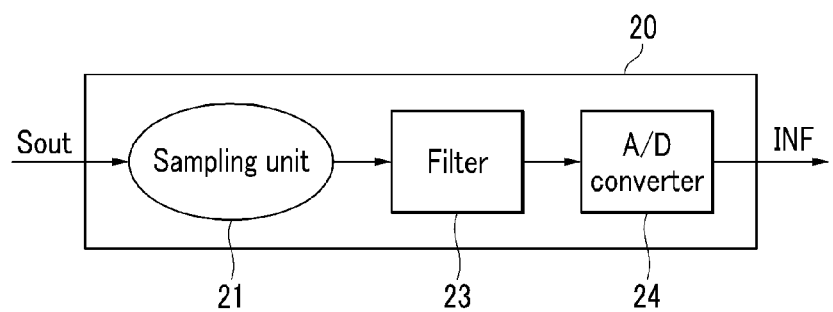
FIG. 20 is a block diagram of another exemplary embodiment of a touch controller according to the present invention.
Figure 21:
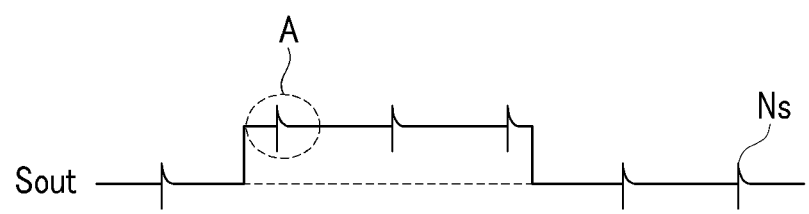
FIG. 21 is a waveform diagram of the sensing output signal according to the exemplary embodiment of a touch controller shown in FIG. 20.
Figure 22:
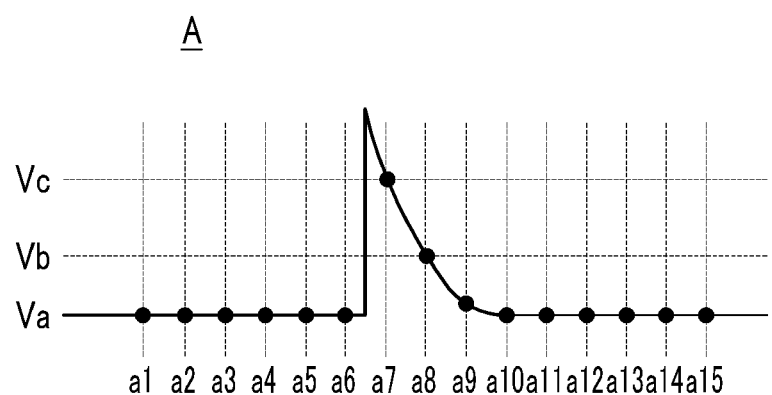
FIG. 22 is an enlarged view of a portion A of the sensing output signal shown in FIG. 21.

FIG. 20 is a block diagram of an exemplary embodiment of a touch controller according to the present invention, FIG. 21 is a waveform diagram of the sensing output signal according to the exemplary embodiment of a touch controller shown in FIG. 20, and FIG. 22 is an enlarged view of a portion A of the sensing output signal shown in FIG. 21.

Referring to FIG. 20, a touch controller 20 of an exemplary embodiment of a touch panel device according to the present invention includes a sampling unit 21, a filter 23 and an A/D converter 24.

The sampling unit 21 receives the sensing output signal Sout from the touch panel 10 for sampling, and sends it to the filter 23.

The filter 23 removes the data corresponding to the coupling noise from the data of the sampled signals, and sends the result to the A/D converter 24.

The A/D converter 24 converts the sampled signal from which the coupling noise is removed into a digital data to generate contact information INF such as the coordinates of the contact position and sends the contact information INF to an external device.

Next, an exemplary embodiment of a method for eliminating the coupling noise through the filter 23 will be described with reference to FIG. 21 and FIG. 22.

As shown in FIG. 21 and FIG. 22, the data at the sampling positions a1, a2, . . . , a15 that are extracted to be converted into digital data include the data Vb and Vc corresponding to the coupling noise Ns as well as the normal data Va. The filter 23 compares the extracted data Va, Vb, and Vc with each other, and if the data at the n-th position an (n=1, 2, . . . , 15) shows a difference greater than a predetermined value in comparison with the surrounding data, the data at the n-th position an (n=1, 2, . . . , 15) is regarded as a coupling noise and is removed. In this way, if a portion corresponding to the coupling noise Ns of the sensing output signal Sout is sampled, the corresponding portion is removed such that an influence of the coupling noise may be removed from the contact information. In the present exemplary embodiment illustrated in FIG. 22 there are 15 sampled positions, however the present invention is not limited thereto.

As described above, according to the present exemplary embodiment, when the touch panel 10 is attached to the display panel 300 or is embedded inside the display panel 300, the coupling noise by the gate signal may be easily removed such that an error in the generation of contact information due to the coupling noise i may be prevented. Also, the touch accuracy of a display device requiring minute touch resolution may be improved.

In the several exemplary embodiments of the present invention, the touch panel may be a touch panel of the various kinds such as a resistive type, a capacitive type, an electro-magnetic ("EM") type, or various other similar types of touch panels. Also, various characteristics of the present invention may be applied to the display device including the touch panel of the various structures.

Further, in an exemplary embodiment of the present invention, the gate signal of the display panel was described as an example as the cause of the coupling noise of the sensing output signal Sout; but the present invention is not limited thereto, and the signal causing the coupling noise may be various signals varying between a high voltage and a low voltage and may be eliminated using devices and methods as described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a touch panel device comprising:
a touch panel; and
a touch controller connected to the touch panel, the touch controller comprising:
a noise removing unit which removes a coupling noise from a sensing output signal input thereto from the touch panel and which outputs a noise-free sensing output signal;
a sampling unit which samples the noise-free sensing output signal to generate a sampled signal; and
an analog/digital converter which converts the sampled signal to generate contact information; and
a display panel device comprising:
a display panel;
a gate driver which applies a gate signal to the display panel; and
a data driver which applies a data voltage to the display panel,
wherein the noise removing unit receives a reference noise signal from the touch panel and generates the noise-free sensing output signal by subtracting the reference noise signal from the sensing output signal, wherein
the touch panel is disposed substantially opposite to the display panel,
the touch panel includes a touch region for sensing a touch and a reference noise extracting region electrically separated from the touch region,
the touch region includes a first electrode which outputs the sensing output signal, and
the reference noise extracting region includes a second electrode which receives a reference voltage including about 0 V and which outputs the reference noise signal to the touch controller, and wherein
the touch region includes a plurality of x-axis electrodes and a plurality of y-axis electrodes insulated from and disposed substantially perpendicular to the plurality of x-axis electrodes,
the sensing output signal is output from a first x-axis electrode of the plurality of x-axis electrodes and a first y-axis electrode of the plurality of y-axis electrodes that correspond to a touch point of the touch panel, and
the reference noise signal is output from at least one of the plurality of x-axis electrodes except the first x-axis electrode and at least one of the plurality of y-axis electrodes except the first y-axis electrode.

2. A display device comprising:
a touch panel device comprising:
a touch panel; and
a touch controller connected to the touch panel, the touch controller comprising:
a noise removing unit;
a sampling unit connected to the noise removing unit; and
an analog/digital converter connected to the sampling unit; and
a display panel device comprising:
a display panel;
a gate driver which applies a gate signal to the display panel; and
a data driver which applies a data voltage to the display panel,
wherein the touch controller inputs a sensing input signal and an inversion sensing input signal, which is inverted with respect to the sensing input signal, to the touch panel, and receives a sensing output signal corresponding to the sensing input signal and an inversion sensing output signal corresponding to the inversion sensing input signal from the touch panel,
the noise removing unit removes a coupling noise from the sensing output signal to generate a noise-free sensing output signal, the sampling unit samples the noise-free sensing output signal to generate a sampled signal, and the analog/digital converter converts the sampled signal to generate contact information, and
the noise removing unit generates the noise-free sensing output signal by subtracting the inversion sensing output signal from the sensing output signal and dividing the subtraction result in half.

3. A display device comprising:
a touch panel device comprising:
a touch panel; and
a touch controller connected to the touch panel, the touch controller comprising:

a sampling unit which samples a sensing output signal input thereto from the touch panel to generate a sampled signal;

a filter which generates a coupling noise removed signal by removing a coupling noise from the sampled signal; and an analog/digital converter which converts the coupling noise removed signal to generate contact information; and a display panel device comprising:

a display panel;

a gate driver which applies a gate signal to the display panel; and a data driver which applies a data voltage to the display panel, wherein the sampled signal includes a plurality of extracted data in series, the filter compares the plurality of extracted data with each other, and the filter compares a value of a first data of the plurality of extracted data with a value of a previous data of the first data and a value of a next data of the first data among the plurality of extracted data, and removes the first data from the plurality of extracted data when a difference between a value of the first data and a value of the previous data, or a difference between the value of the first data and a value of the next data, is equal to or greater than a predetermined value.

4. A method for eliminating a coupling noise of a display device including a touch panel device including a touch panel and a touch controller, and a display panel device including a display panel, a gate driver which applies a gate signal to the display panel, and a data driver which applies a data voltage to the display panel, the method comprising:

receiving a sensing output signal including a coupling noise, and a reference noise signal from the touch panel;

generating a noise-free sensing output signal by subtracting the reference noise signal from the sensing output signal to remove the coupling noise from the sensing output signal;

sampling the noise-free sensing output signal to generate a sampled signal; and generating contact information by converting the sampled signal, wherein the touch region includes a plurality of x-axis electrodes and a plurality of y-axis electrodes insulated from and disposed substantially perpendicular to the x-axis electrodes, the sensing output signal is output from a first x-axis electrode and a first y-axis electrode corresponding to a touch point of the touch panel among the plurality of x-axis electrodes and the plurality of y-axis electrodes, and the reference noise signal is output from at least one of the plurality of x-axis electrodes except the first x-axis electrode and from at least one of the plurality of y-axis electrodes except the first y-axis electrode.

5. A method for eliminating a coupling noise of a display device including a touch panel device including a touch panel and a touch controller, and a display panel device including a display panel, a gate driver which applies a gate signal to the display panel, and a data driver which applies a data voltage to the display panel, the method comprising:

inputting a sensing input signal and an inversion sensing input signal, which is an inverted signal of the sensing input signal, to the touch panel;

receiving a sensing output signal corresponding to the sensing input signal, and an inversion sensing output signal corresponding to the inversion sensing input signal from the touch panel;

generating a noise-free sensing output signal by subtracting the inversion sensing output signal from the sensing output signal and dividing the subtraction result in half;

generating a sampled signal by sampling the noise-free sensing output signal; and generating contact information by converting the sampled signal.

6. A method for eliminating a coupling noise of a display device including a touch panel device including a touch panel and a touch controller, and a display panel device including a display panel, a gate driver which applies a gate signal to the display panel, and a data driver which applies a data voltage to the display panel, the method comprising:

receiving a sensing output signal including a coupling noise from the touch panel;

generating a sampled signal by sampling the sensing output signal;

generating a coupling noise removed signal by removing the coupling noise from the sampled signal; and generating contact information by converting the coupling noise removed signal, wherein the sampled signals include a plurality of extracted data in series, the removing of the coupling noise from the sampled signal comprises:

comparing a value of a first data of the plurality of extracted data with a value of a previous data of the first data and a value of a next data of the first data among the plurality of extracted data; and removing the first data from the plurality of extracted data when a difference between a value of the first data and a value of the previous data or a difference between the value of the first data and a value of the next data is equal to or greater than a predetermined value.

* * * * *